US012759454B2

(12) United States Patent
Hawley

(10) Patent No.: US 12,759,454 B2
(45) Date of Patent: Oct. 13, 2026

(54) TRUCK BED HAULING SECURING SYSTEM FOR LOADS HANGING OVER THE TAILGATE

(71) Applicant: Toyota Motor Engineering & Manufacturing North America, Inc., Plano, TX (US)

(72) Inventor: Thomas S. Hawley, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 872 days.

(21) Appl. No.: 17/890,135

(22) Filed: Aug. 17, 2022

(65) Prior Publication Data

US 2024/0059210 A1 Feb. 22, 2024

(51) Int. Cl.
*B60P 7/00* (2006.01)
*B60P 3/40* (2006.01)
(Continued)

(52) U.S. Cl.
CPC ................ *B60P 7/135* (2013.01); *B60P 3/40* (2013.01); *B60P 7/0892* (2013.01)

(58) Field of Classification Search
CPC B60P 7/135; B60P 7/0892; B60P 3/40; B60P 7/12; B60P 7/14; B60P 7/15; B62D 33/02
USPC ................ 410/32, 34, 42, 47, 94, 121, 153, 410/129–130, 132, 139–145, 149–151; 296/51
See application file for complete search history.

(56) References Cited

U.S. PATENT DOCUMENTS 2,855,217 A * 10/1958 Bagwell .................... B60P 3/40 410/32
4,650,383 A * 3/1987 Hoff .......................... B60P 7/15 410/149

(Continued)

FOREIGN PATENT DOCUMENTS

WO WO2006040471 4/2006

OTHER PUBLICATIONS

Real Truck—The K2 Flipping Truck Rack website https://realtruck.com/p/k2-flipping-truck-rack 5 pages.

(Continued)

*Primary Examiner* — Stephen T Gordon
(74) *Attorney, Agent, or Firm* — Snell & Wilmer LLP

(57) ABSTRACT

A tailgate support system enables drivers and passengers to secure their cargo via their vehicle tailgate and bed of the vehicle. When hauling lumber or long objects they sit in the bed with some overhang out the bed above the tailgate. During turning or hitting bumps the load can sometimes move and fall out. Incorporating features into the bed and/or the tailgate can improve securing large loads in the bed of a truck by providing a vertical support to prevent it from tipping over and a lateral support to prevent it from sliding out from the sides. The tailgate support system for attaching to a tailgate of a vehicle where the tailgate has a top surface. The tailgate support system may include a plurality of dividers and a plurality of apertures disposed along the top surface of the tailgate and configured to receive the plurality of dividers.

19 Claims, 4 Drawing Sheets

(51) Int. Cl.
*B60P 7/08* (2006.01)
*B60P 7/135* (2006.01)

(56) References Cited

U.S. PATENT DOCUMENTS

| | | | | |
|---|---|---|---|---|
| 5,037,152 | A | 8/1991 | Hendricks | |
| 5,253,913 | A | 10/1993 | Metivier | |
| 6,210,087 | B1 * | 4/2001 | Bacon | B60P 7/0892 410/121 |
| 6,343,826 | B2 | 2/2002 | Bohannon | |
| 6,364,392 | B1 | 4/2002 | Meinke | |
| 6,607,338 | B2 * | 8/2003 | Lemke | B60P 7/15 410/143 |
| 6,698,810 | B1 | 3/2004 | Lane | |
| 6,983,968 | B2 | 1/2006 | Brauer et al. | |
| 6,991,277 | B1 | 1/2006 | Esler | |
| 7,156,592 | B1 * | 1/2007 | Cava | B60P 7/15 410/121 |
| 7,494,169 | B2 | 2/2009 | Collins | |
| 7,513,726 | B1 * | 4/2009 | Comiskey, Jr. | B60P 3/40 410/32 |
| 7,914,060 | B2 | 3/2011 | Scribner et al. | |
| 9,592,769 | B1 | 3/2017 | Oliver | |
| 9,902,307 | B2 * | 2/2018 | Higgins | B60P 7/15 |
| 11,046,372 | B1 | 6/2021 | Traugh | |
| 2008/0309110 | A1 * | 12/2008 | Jones | B60P 3/40 296/57.1 |
| 2012/0308325 | A1 | 12/2012 | Pennisi | |

OTHER PUBLICATIONS

This Old House—Hauling Long Lumber website https://thisoldhouse.com/woodworking/21019369/hauling-long-lumber, 5 pages.

* cited by examiner

TRUCK BED HAULING SECURING SYSTEM FOR LOADS HANGING OVER THE TAILGATE

BACKGROUND

1. Field

The various aspects described herein relate to apparatus and methods for stabilizing cargo carried by a vehicle via a tailgate of the vehicle.

2. Description of the Related Art

Vehicles such as pick-up trucks, sport utility vehicles (SUVs), utility terrain vehicles (UTVs), minivans, station wagons, and the like have beds and trunks suitable to hold and transport long cargo (e.g., wood slabs, logs, glass panels, furniture, piping, moulding, etc.). However, such long cargo often extends over the tailgate of a vehicle and requires the use of straps and tie-downs. Fastening cargo with straps, tie-downs, and/or the like may be time consuming and they may come undone if not set up properly. As a result, the cargo may be rattling, damaged, and/or fall out if not set up properly. Furthermore, using straps, tie-downs, and/or the like requires such to be stored when not in use, taking up space, and risking forgetting or losing them. Thus, there is a need for a vehicle securing system for long cargo or loads.

SUMMARY

A tailgate support system enables drivers and passengers to secure their cargo via their vehicle tailgate and bed of the vehicle. When hauling lumber or long cargo, loads, or objects, they sit in the bed (e.g., an open compartment or space) with some overhang out the bed above the tailgate. During turning or hitting bumps, the cargo or load can sometimes move and fall out. Incorporating features into the bed and/or the tailgate can improve securing large loads in the bed of a truck or vehicle by providing a vertical support to prevent it from tipping over and a lateral support to prevent it from sliding out from the sides. The tailgate support system for attaching to a tailgate of a vehicle where the tailgate has a top edge or a top surface. The tailgate support system may include a plurality of dividers and a plurality of apertures disposed along the top surface of the tailgate and configured to receive the plurality of dividers.

In accordance with an example embodiment, a tailgate support system is disclosed herein. The tailgate support system includes a tailgate having a top surface, a plurality of apertures disposed along the top surface, and a plurality of dividers. The plurality of apertures are configured to receive the plurality of dividers.

In various embodiments, the plurality of dividers are configured to be stored in the bed or the tailgate such that the plurality of dividers extend along a height of the tailgate perpendicular to the top surface.

In various embodiments, the plurality of apertures comprises a first aperture, a second aperture, a third aperture, and a fourth aperture. The plurality of dividers includes a first divider, a second divider, a third divider, and a fourth divider. The first divider is coupled to the first aperture, the second divider is coupled to the second aperture, the third divider is coupled to the third aperture, and the fourth divider is coupled to the fourth aperture. The tailgate support system may also include a plurality of caps that fit on top of the plurality of dividers to prevent water and debris from entering into the plurality of apertures.

In various embodiments, the plurality of dividers is configured to be movably coupled to the plurality of aperture. The plurality of dividers is configured to be moved from the plurality of apertures such that the plurality of dividers extends from the top surface of the tailgate.

In various embodiments, the tailgate support system includes a pop-up mechanism configured to move the plurality of dividers out from the tailgate through the apertures.

In various embodiments, the plurality of dividers is configured to be independently locked into place at the desired height such that the first divider is locked at a first height, the second divider is locked at a second height, the third divider is locked at a third height, and the fourth divider is locked at a fourth height. The first height, the second height, the third height, and the fourth height may be the same or different.

In various embodiments, the tailgate support system includes a safety attachment configured to couple to the plurality of dividers such that the safety attachment extends between the plurality of dividers.

In various embodiments, the plurality of apertures is evenly spaced across the top surface.

In various embodiments, a rear support system is disclosed herein. The rear support system includes a main bar having a first end and a second end opposite the first end, a first side bar having a first end and a second end, a second side bar having a first end and a second end, and a locking mechanism configured to lock the main bar at a desired position. The first end of the first side bar is coupled to the first end of the main bar. The first end of the second side bar is coupled to the second end of the main bar. The desired height corresponds with a load being hauled in a truck bed. In various embodiments, the main bar extends across a width of the truck bed.

In various embodiments, the second end of the first side bar and the second end of the second side bar are configured to be coupled to the truck bed. The first and second side bars are coupled to the truck bed via hinges such that the second end of the first side bar and the second end of the second side bar are configured as pivot points for the main bar.

The locking mechanism may include a plurality of receivers. Each of the plurality of receivers is disposed at a plurality of positions along a side of the truck bed. The plurality of receivers is defined by apertures configured to receive the main bar to lock the main bar at the desired position.

The rear support system may include at least one secondary bar rotatably coupled to the main bar. The at least one secondary bar is configured to slide along the main bar. The at least one secondary bar is fixed to the main bar.

A vehicle is disclosed herein. The vehicle has a tailgate, and the tailgate has a top surface. The vehicle includes a tailgate support system and a rear support system. The tailgate support system includes a plurality of apertures disposed along the top surface of the tailgate, and a plurality of dividers. The plurality of apertures is configured to receive the plurality of dividers. The rear support system includes a main bar having a first end and a second end opposite the first end, a first side bar having a first end and a second end, a second side bar having a first end and a second end, and a locking mechanism configured to lock the main bar at a desired position. The first end of the first side bar is coupled to the first end of the main bar. The first end of the second side bar is coupled to the second end of the main bar. The desired height corresponds with a load being hauled in a truck bed.

BRIEF DESCRIPTION OF THE DRAWINGS

Other apparatus, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The apparatus and methods described herein enable users (e.g., drivers and/or passengers (interchangeable when referring to autonomous or semi-autonomous vehicles)) to secure their cargo via their vehicle tailgate and bed of the vehicle. Commonly, when hauling lumber or long objects they sit in the bed with some overhang out the bed above the tailgate. During turning or hitting bumps sometimes the load can move and fall out. Incorporating features (such as those from a vehicle support system) into the bed and/or the tailgate can improve securing large loads in the bed of a truck by providing a vertical support to prevent it from tipping over and a lateral support to prevent it from sliding out from the sides.

For instance, a rear support system may be configured to swing a bar out from the back of the cab (e.g., a rear wall of the truck bed) and be attached and/or fixed to the rear wall at various heights to lock in the bar. Such a vertical component locking the loads into place prevents the loads from tipping out even during small shifting. The side of the bed may include various settings to lock in the bar at a particular angle to allow support to the load to prevent tipping out. Additional lateral support bars may be provided to keep material from sliding the full width of the bed. Additionally or alternatively, a tailgate support system may be configured to control the loads from sliding around the back in the tailgate with one or more pop-up dividers built into the tailgate of the truck. Pop-up vertical bars can be locked in at varying heights, and an additional top horizontal bars can be added to fully lock in the load. This combined with the rear cab support system allows for safe transportation of the load without additional straps or tie downs, for instance.

Figure 1:
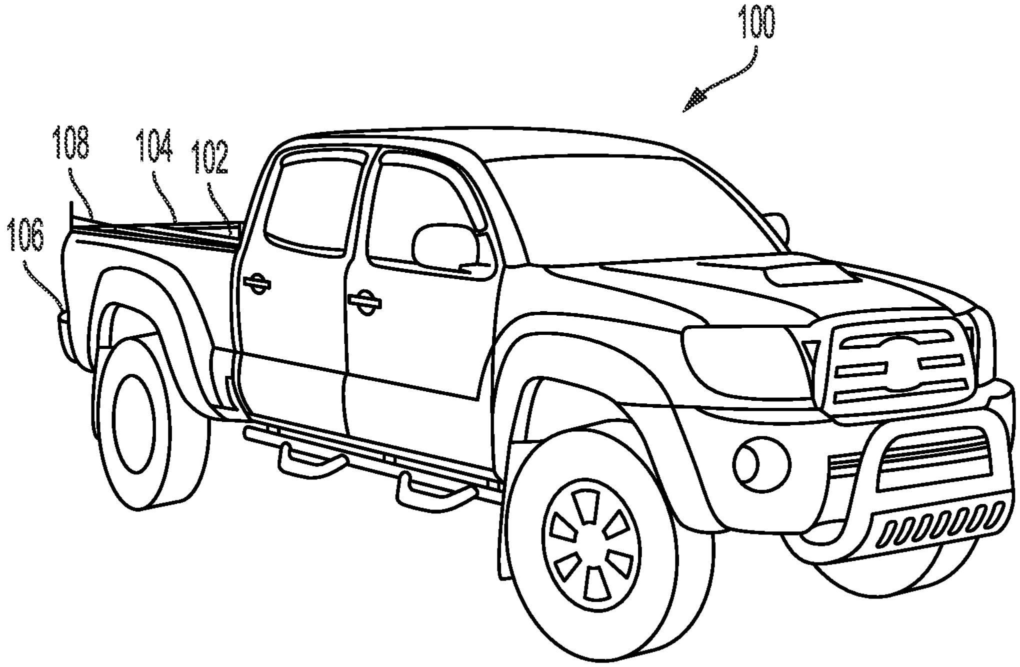
FIG. 1 illustrates a perspective view of a vehicle according to an aspect of the present disclosure.

FIG. 1 illustrates a perspective view of a vehicle 100 according to an aspect of the present disclosure. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a pick-up truck, an SUV, a UTV, a minivan, a stain wagon, or another other motor or battery driven vehicle. For example, the vehicle 100 may be an electric vehicle, a hybrid vehicle, a plug-in hybrid vehicle, a fuel cell vehicle, or any other type of vehicle that includes a motor/generator.

FIG. 1 depicts a pick-up truck by example. The vehicle 100 may be an autonomous or semi-autonomous vehicle having self-driving capabilities. The vehicle 100 may have a truck bed 102 enclosed by a tailgate 104 from a rear end 106. The tailgate 104 may be manufactured from metal, glass, plastic, and/or wood. The truck bed 102 may have an open top or a closed top. The truck bed 102 may be suitable to store and transport cargo. The truck bed 102 may accommodate cargo that has a length longer than a length 108 of the truck bed 102. For instance, the cargo may extend out from the tailgate 104. In some embodiments, the tailgate 104 may enclose a trunk.

Figure 2B:
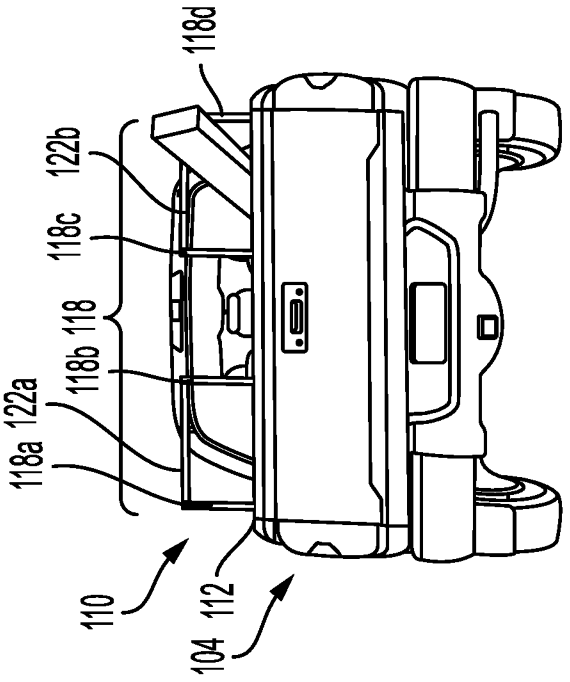
FIGS. 2A-2B illustrates a rear view of the vehicle of FIG. 1 showing a tailgate support system according to an aspect of the present disclosure.
Figure 2A:
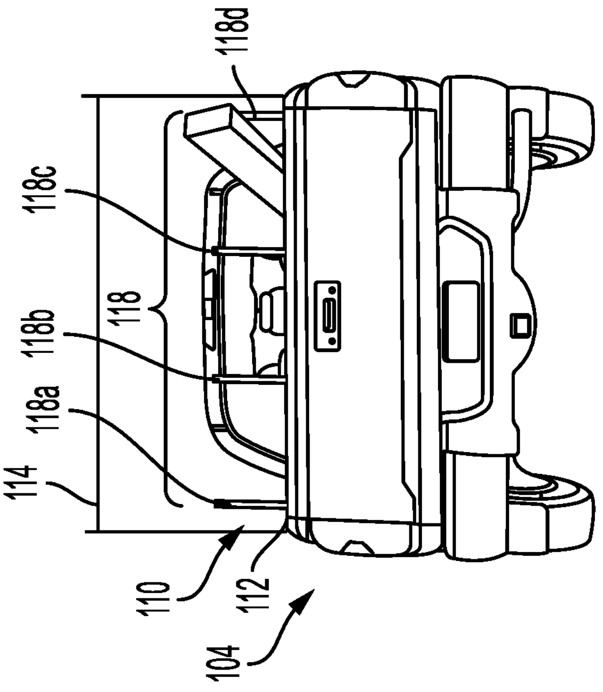
Figure 2C:
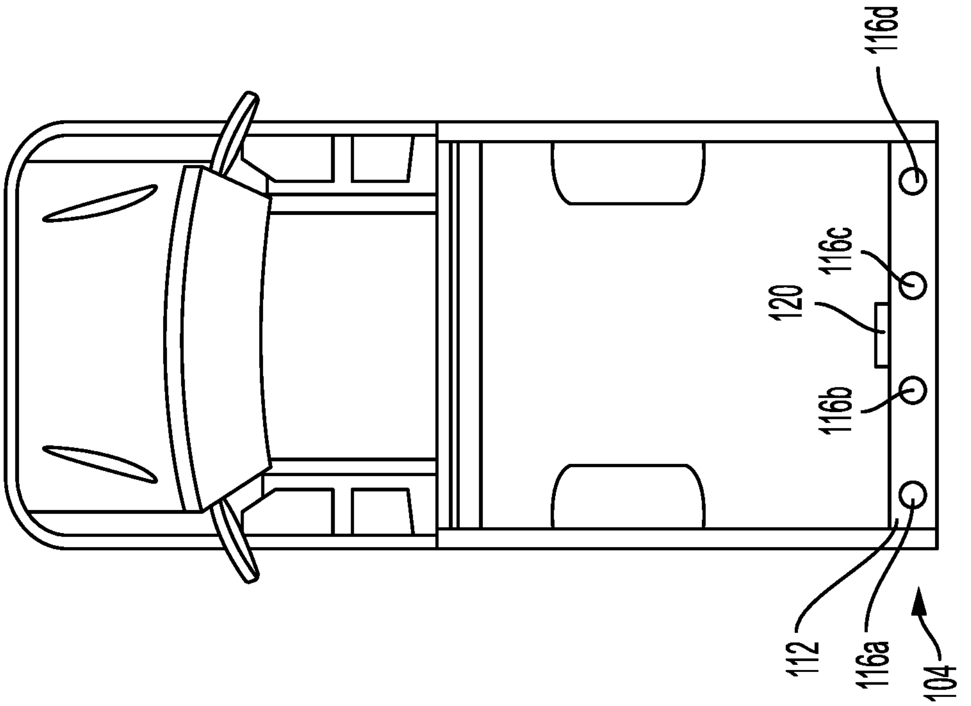
FIG. 2C illustrates a top view of the vehicle of FIG. 1 showing a a tailgate support system according to an aspect of the present disclosure.

Referring now to FIGS. 2A-2C, a tailgate support system 110 of the vehicle 100 is illustrated according to an aspect of the present disclosure. The tailgate support system 110 includes a top surface 112 of the tailgate 104. The top surface 112 extends a width 114 of the truck bed 102. The tailgate support system 110 includes a plurality of apertures (or openings) 116 extending downward into the tailgate 104 in a vertical direction (see FIG. 2C). The plurality of apertures 116 may be disposed along the top surface 112. For example, in various embodiments, the plurality of apertures 116 includes four apertures, as shown in FIGS. 2A-2C. The plurality of apertures 116 may be evenly spaced apart across the top surface 112. In various embodiments, the plurality of apertures 116 may be configured to be spaced such that a first aperture 116*a* and a second aperture 116*b* are closer together than the second aperture 116*b* and a third aperture 116*c*, and the third aperture 116*c* and a fourth aperture 116*d* are closer together than the second aperture 116*b* and the third aperture 116*c*. The spacing advantageously allows for different sized cargo or loads to be securely and properly held in the bed of the truck.

The tailgate 104 includes a plurality of dividers 118. The plurality of dividers 118 may be a bar, a rod, a shaft, etc. The plurality of dividers 118 are configured to be stored within the tailgate 104. For instance, the plurality of dividers 118 may be stored within the tailgate 104 such that the plurality of dividers 118 extend along a height of the tailgate 104 (e.g., perpendicular to the top surface 112). The plurality of dividers 118 are configured to be movably coupled up and down within the plurality of apertures 116. For instance, a first divider 118*a* may be coupled to the first aperture 116*a*, a second divider 118*b* may be coupled to the second aperture 116*b*, a third divider 118*c* may be coupled to the third aperture 116*c*, and a fourth divider 118*d* may be coupled to the fourth aperture 116*d*. The plurality of dividers 118 are configured to be received by the plurality of apertures 116, to be stored within the tailgate 104, and to be pulled upward from or removed from the plurality of apertures 116 when in use. Accordingly, the plurality of dividers 118 are configured to be "pop-up" dividers from the tailgate 104. Each of the plurality of dividers 118 may have a built-in spring mechanism 120 to allow the divider 118 to move upward. In use, the plurality of dividers 118 extend from the top surface 112 (e.g., out through the plurality of apertures 116) thus controlling the load from sliding around within the truck bed 102.

The tailgate support system 110 further includes a pop-up or spring mechanism 120. The pop-up mechanism 120 may be configured to lift the plurality of dividers 118 out from the tailgate 104 through the apertures 116. In various embodiments, the pop-up mechanism 120 may be a ratcheting mechanism. For instance, the plurality of dividers 118 may be operatively coupled to the ratcheting mechanism configured to be manually rotated and move the plurality of dividers 118. The ratcheting mechanism may further be configured to lock the plurality of dividers 118 at a desired height. As an example, with the ratcheting mechanism, the divider 118 can by pulled up and when at the desired height, can be rotated clockwise 90 degrees or 180 degrees to lock in place. To unlock, the divider 118 can be rotated counter clockwise 90 degrees or 180 degrees to unlock and allow the divider 118 to move up and down again. In various embodiments, the pop-up mechanism 120 may be a tab. For instance, a tab may be coupled to each of the plurality of dividers 118 and accessible from the plurality of apertures 116. As such, the plurality of dividers 118 may be pulled out of the tailgate 104 via the tab. In various embodiments, the pop-up mechanism 120 may be a push button. For instance, the push button may be operatively coupled to a motor, the motor being coupled to the plurality of dividers 118 such that the plurality of dividers 118 are raised from the tailgate 104 when the push button is pushed.

In various embodiments, the plurality of dividers 118 are configured to be independently locked into place at the desired height. For instance, the first divider 118*a* may be locked at a first height, the second divider 118*b* may be locked at a second height, the third divider 118*c* may be locked at a third height, and the fourth divider 118*d* may be locked at a fourth height. The first height may be greater than the second height. The second height may be greater than the third height. The third height may be greater than the fourth height. In various embodiments, as shown in FIG. 2A, the plurality of dividers 118 may be locked at the same height. In various embodiments, as shown in FIG. 2B, the first divider 118*a* and the second divider 118*b* may be locked at the first height, and the third divider 118*c* and the fourth divider 118*d* may be locked at the third height.

Referring particularly to FIG. 2B, the tailgate support system 110 includes a safety attachment 122. The safety attachment 122 may be configured to provide additional security to retain the load between the plurality of dividers 118. The safety attachment 122 may be configured to couple to two of the plurality of dividers 118, thus form an enclosure between the plurality of dividers 118 and the safety attachment 122. For instance, a first safety attachment 122*a* may extend between the first divider 118*a* and the second divider 118*b*, and a second safety attachment 122*b* may extend between the third divider 118*c* and the fourth divider 118*d*. In various embodiments, the safety attachment 122 may extend between more than two of the plurality of the dividers 118. In various embodiments, the safety attachment 122 may be a bar, a rod, a shaft, or another rigid piece configured to snap, latch, etc. into the plurality of dividers 118. In various embodiments, the safety attachment may be a strap configured to be tied, hooked, etc. to the plurality of dividers 118.

Figure 3A:
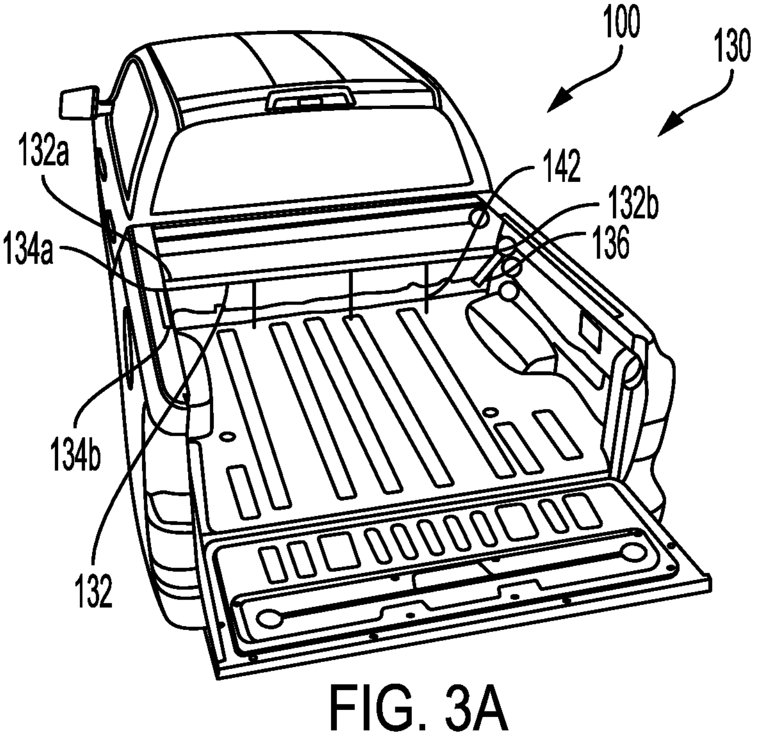
FIG. 3A illustrates a perspective rear view of the vehicle of FIG. 1 showing a rear support system according to an aspect of the present disclosure.
Figure 3B:
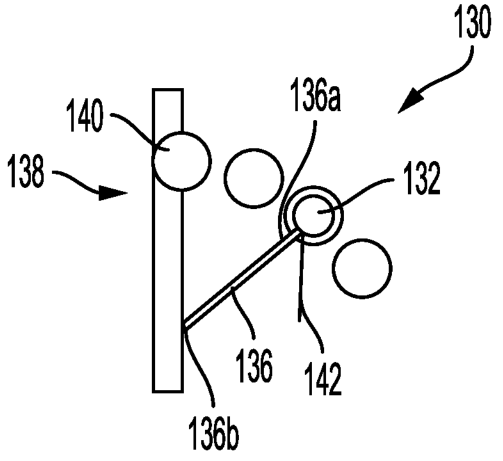
FIG. 3B illustrates a side view of a portion of the vehicle of FIG. 1 showing the rear support system according to an aspect of the present disclosure.

Referring now to FIGS. 3A-3B, a rear support system 130 of the vehicle 100 is illustrated according to an aspect of the present disclosure. The rear support system 130 includes a main bar 132 having a first end 132*a* and a second end 132*b* opposite the first end 132*a*. The main bar 132 extends across the entire width 114 of the truck bed at the rear of the truck bed (e.g., adjacent to the rear truck bed wall). The main bar 132 is configured to be fixed to the side walls of the truck bed and at various heights to prevent the cargo or load(s) from tipping or falling out.

The rear support system 130 further includes a first side bar 134 and a second side bar 136. The first side bar 134 includes a first end 134*a* and a second end 134*b*. The second side bar includes a first end 136*a* and a second end 136*b*. The first and second side bars 134, 136 are coupled to the main bar 132 at each end of the main bar 132. For instance, the first end 134*a* of the first side bar 134 is coupled to the first end 132*a* of the main bar 132, and the first end 136*a* of the second side bar 136 is coupled to the second end 132*b* of the main bar 132. The second end 134*b* of the first side bar 134 and the second end 136*b* of the second side bar 136 are configured to be coupled to the interior sides of the truck bed 102. In various embodiments, the first and second side bars 134, 136 are coupled to the truck bed 102 via hinges. Accordingly, the second end 134*b* of the first side bar 134 and the second end 136*b* of the second side bar 136 are configured to function as pivot points for the main bar 132.

The rear support system 130 further includes a locking mechanism 138 (e.g., see FIG. 3B). The locking mechanism 138 is configured to receive the main bar 132 and lock the main bar 132 at a desired position. The desired position may be a height corresponding with the load being hauled in the truck bed 102. The locking mechanism 138 includes a plurality of receivers 140. In various embodiments, the plurality of receivers 140 may include four receivers. Each of the plurality of receivers 140 are disposed at varying positions (e.g., heights) along a side of the truck bed 102. The plurality of receivers 140 may be defined by apertures in or on the side of the truck bed 102. In various embodiments, the plurality of receivers 140 may include a plastic sleeve sized and shaped to be received by the apertures. The plurality of receivers 140 are configured to receive the main bar 132. As such, the plurality of receivers 140 are configured to lock the main bar 132 at the desired position.

The locking mechanism 138 may further include a fastener (not shown). The fastener is configured to fasten the main bar 132 into the desired receiver of the plurality of receivers 140. For instance, the fastener may include a pin configured to be received by an aperture disposed on the main bar 132. In various embodiments, the fastener may include a latch-lock component.

Referring to FIGS. 3A-3B, the rear support system 130 includes at least one secondary bar 142. The at least one secondary bar 142 is configured to further secure the load from sliding laterally even during small shifting. The at least one secondary bar 142 may be rotatably coupled to the main bar 132. For instance, the at least one secondary bar 142 is configured to rotate down from the main bar 132 and contact a bottom of the truck bed 102. In various embodiments, the at least one secondary bar 142 may be a rigid bar. As such, the at least one secondary bar 142 may be configured to remain rotatable (e.g., not locked) while providing lateral support, preventing the load from shifting across the width 114. In various embodiments, the at least one secondary bar 142 may be configured to attach to and/or lock to the bottom of the truck bed 102. In various embodiments, the at least one secondary bar 142 may be configured to slide along the main bar 132 to the desired position. In various embodiments, the at least one secondary bar 142 may be in a fixed position on the main bar 132. In various embodiments, the at least one secondary bar 142 may include two or more secondary bars 142.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A tailgate support system comprising:
a tailgate having a top surface and configured to be attached to a rear end of a truck bed;
a plurality of apertures disposed along the top surface and extending into the tailgate; and
a plurality of dividers including a first divider, a second divider, a third divider, and a fourth divider and configured to be positioned within the plurality of apertures, each of the plurality of dividers having a stored position when inside the tailgate and an extended position when extending above the top surface of the tailgate, and each of the plurality of dividers being configured to be independently locked into place at a desired height above the top surface such that the first divider can be locked at a first height, the second divider can be locked at a second height, the third divider can be locked at a third height, and the fourth divider can be locked at a fourth height,
wherein at least two of the first height, the second height, the third height, and the fourth height are different heights.

2. The tailgate support system of claim 1, wherein each of the plurality of dividers extend along a height of the tailgate perpendicular to the top surface of the tailgate when in the stored position.

3. The tailgate support system of claim 1, wherein the plurality of apertures comprises a first aperture, a second aperture, a third aperture, and a fourth aperture.

4. The tailgate support system of claim 3, wherein the first divider is movably coupled to the first aperture, the second divider is movably coupled to the second aperture, the third divider is movably coupled to the third aperture, and the fourth divider is movably coupled to the fourth aperture.

5. The tailgate support system of claim 4, wherein the plurality of dividers are configured to be raised from the plurality of apertures such that the plurality of dividers extends from the top surface of the tailgate and wherein the plurality of dividers are configured to be lowered into the plurality of apertures to be stored within the tailgate.

6. The tailgate support system of claim 4, further comprising a pop-up mechanism coupled to each of the plurality of dividers and configured to move the plurality of dividers out from the tailgate through the apertures.

7. The tailgate support system of claim 1, further comprising a first safety attachment configured to couple to the first divider and the second divider such that the first safety attachment extends between the first divider and the second divider and a second safety attachment configured to couple to the third divider and the fourth divider such that the second safety attachment extends between the third divider and the fourth divider.

8. The tailgate support system of claim 1, wherein the plurality of apertures are evenly spaced across the top surface.

9. A rear support system, comprising:
a main bar having a first end and a second end opposite the first end;
a first side bar having a first end and a second end, the first end of the first side bar coupled to the first end of the main bar and the second end of the first side bar coupled to a truck bed;
a second side bar having a first end and a second end, the first end of the second side bar coupled to the second end of the main bar and the second end of the second side bar coupled to the truck bed;
at least one secondary bar with a first end rotatably coupled to the main bar and a second end configured to contact a bottom of the truck bed; and
a locking mechanism having a plurality of sets of receivers, each set of receivers including:
a first receiver disposed in or on a first side of the truck bed, and
a second receiver disposed in or on a second side of the truck bed opposite the first side, the first receiver and the second receiver of each set of receivers being positioned to support and retain the first end and the second end of the main bar, respectively, at a selected height relative to the truck bed, each set of receivers corresponds to a different selected height of the main bar relative to the truck bed, and
wherein the selected height corresponds with a size of a load being hauled in the truck bed.

10. The rear support system of claim 9, wherein the main bar extends across a width of the truck bed.

11. The rear support system of claim 9, wherein the second ends of the first and second side bars are coupled to the truck bed via hinges such that the second end of the first side bar and the second end of the second side bar are configured as pivot points for the main bar.

12. The rear support system of claim 9, wherein each of the plurality of sets of receivers is defined by apertures configured to receive the first end and the second end of the main bar to retain the main bar at the selected height.

13. The rear support system of claim 9, wherein the at least one secondary bar is configured to slide along the main bar.

14. The rear support system of claim 9, wherein the at least one secondary bar is fixed to the main bar.

15. A vehicle having a tailgate with a top surface, the vehicle comprising:
a tailgate support system including:
a plurality of apertures disposed along the top surface of the tailgate; and
a plurality of dividers including at least a first divider and a second divider configured to be positioned within the plurality of apertures, each of the plurality of dividers having a stored position when inside the tailgate and an extended position when extending above the top surface of the tailgate, and the first divider and the second divider configured to be independently locked into place at a desired height above the top surface such that the first divider and the second divider are lockable at different heights above the top surface; and
a rear support system including:
a main bar having a first end and a second end opposite the first end, the main bar extending across a truck bed;
a first side bar having a first end and a second end, the first end of the first side bar coupled to the first end of the main bar and the second end of the first side bar coupled to the truck bed;
a second side bar having a first end and a second end, the first end of the second side bar coupled to the second end of the main bar and the second end of the second side bar coupled to the truck bed; and at least one secondary bar with a first end rotatably coupled to the main bar and a second end configured to contact a bottom of the truck bed.

16. The tailgate support system of claim 7, wherein the first safety attachment extends horizontally at a first height and the second safety attachment extends horizontally at a second height.

17. The tailgate support system of claim 16, wherein the first horizontal height and the second height are different.

18. The rear support system of claim 9, wherein the at least one secondary bar is configured to secure a load in the truck bed from shifting laterally.

19. The vehicle of claim 15, wherein the rear support system further comprises a locking mechanism comprising a plurality of sets of receivers, each set of receivers including a first receiver disposed in or on a first side of the truck bed and a second receiver disposed in or on a second side of the truck bed opposite the first side, the first receiver and the second receiver of each set of receivers being positioned to support and retain the first end and the second end of the main bar, respectively, at a selected height relative to the truck bed, each set of receivers corresponding to a different selected height of the main bar relative to the truck bed.

* * * * *